US012682047B2

(12) United States Patent
Liu et al.

(10) Patent No.: US 12,682,047 B2
(45) Date of Patent: Jul. 14, 2026

(54) MACHINE LEARNING TIME SERIES ANOMALY DETECTION

(71) Applicant: Google LLC, Mountain View, CA (US)

(72) Inventors: Jiashang Liu, Kirkland, WA (US); Xi Cheng, Kirkland, WA (US); Amir Hormati, Mountain View, CA (US); Weijie Shen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 965 days.

(21) Appl. No.: 17/664,865

(22) Filed: May 24, 2022

(65) Prior Publication Data

US 2022/0382857 A1 Dec. 1, 2022

Related U.S. Application Data

(60) Provisional application No. 63/193,022, filed on May 25, 2021.

(51) Int. Cl.
| | |
|---|---|
| *G06F 21/55* | (2013.01) |
| *G06F 16/242* | (2019.01) |
| *G06N 20/00* | (2019.01) |

(52) U.S. Cl.
CPC ........ *G06F 21/552* (2013.01); *G06F 16/2438* (2019.01); *G06N 20/00* (2019.01); *G06F 2221/034* (2013.01)

(58) Field of Classification Search
CPC ............... G06F 21/552; G06F 16/2438; G06F 2221/034; G06F 17/18; G06N 20/00; H04L 63/1425
See application file for complete search history.

(56) References Cited

U.S. PATENT DOCUMENTS

| | | | |
|---|---|---|---|
| 8,768,864 | B2 | 7/2014 | Kane-Esrig |
| 10,824,120 | B2 | 11/2020 | Ahmed |

(Continued)

FOREIGN PATENT DOCUMENTS

| | | |
|---|---|---|
| CN | 107430387 A | 12/2017 |
| CN | 110795703 A | 2/2020 |

(Continued)

OTHER PUBLICATIONS

Aug. 19, 2022 Written Opinion (WO) of the International Searching Authority (ISA) and International Search Report (ISR) issued in International Application No. PCT/US2022/072546.

(Continued)

*Primary Examiner* — Kc Chen
(74) *Attorney, Agent, or Firm* — Shumaker & Sieffert, P.A.

(57) ABSTRACT

A method includes receiving a time series anomaly detection query from a user and training one or more models using a set of time series data values. For each respective time series data value in the set, the method includes determining, using the trained models, an expected data value for the respective time series data value and determining a difference between the expected data value and the respective time series data value. The method also includes determining that the difference between the expected data value and the respective time series data value satisfies a threshold. In response to determining that the difference between the expected data value and the respective time series data value satisfies the threshold, the method includes determining that the respective time series data value is anomalous and reporting the anomalous respective time series data value to the user.

16 Claims, 5 Drawing Sheets

(56) References Cited

U.S. PATENT DOCUMENTS

| | | | |
|---|---|---|---|
| 11,126,660 | B1 | 9/2021 | Sen et al. |
| 11,574,242 | B1 | 2/2023 | Burke et al. |
| 11,586,706 | B2 | 2/2023 | Higginson et al. |
| 11,636,377 | B1 | 4/2023 | Xu et al. |
| 11,651,271 | B1 | 5/2023 | Xu et al. |
| 12,164,605 | B2 | 12/2024 | Hu et al. |
| 12,293,320 | B2 | 5/2025 | Doan Huu |
| 2012/0316835 | A1 | 12/2012 | Maeda et al. |
| 2012/0330931 | A1* | 12/2012 | Nakano .............. G05B 23/0283 707/E17.082 |
| 2016/0062950 | A1 | 3/2016 | Brodersen et al. |
| 2016/0117196 | A1* | 4/2016 | Talwar ................ G06F 11/3476 718/104 |
| 2016/0132775 | A1 | 5/2016 | Baughman et al. |
| 2016/0217022 | A1 | 7/2016 | Velipasaoglu et al. |
| 2018/0012130 | A1 | 1/2018 | Taylor et al. |
| 2018/0039555 | A1 | 2/2018 | Salunke et al. |
| 2018/0300737 | A1 | 10/2018 | Bledsoe et al. |
| 2020/0035001 | A1 | 1/2020 | Pang |
| 2020/0074370 | A1 | 3/2020 | Oliveira Almeida et al. |
| 2020/0074401 | A1 | 3/2020 | Oliveira Almeida et al. |
| 2020/0273079 | A1 | 8/2020 | Raviv et al. |
| 2020/0320343 | A1 | 10/2020 | Cohen et al. |
| 2020/0357001 | A1 | 11/2020 | Lopez Garcia et al. |
| 2021/0208545 | A1 | 7/2021 | Zhang et al. |
| 2021/0357402 | A1 | 11/2021 | Cheng et al. |
| 2022/0083897 | A1 | 3/2022 | Saha et al. |
| 2022/0237102 | A1 | 7/2022 | Bugdayci et al. |

FOREIGN PATENT DOCUMENTS

| | | |
|---|---|---|
| CN | 111027764 A | 4/2020 |
| CN | 111625516 A | 9/2020 |
| JP | H11212947 A | 8/1999 |
| JP | 2011145846 A | 7/2011 |
| JP | 2014096050 A | 5/2014 |
| WO | 2020090770 A1 | 5/2020 |
| WO | 2021061090 A1 | 4/2021 |

OTHER PUBLICATIONS

Final Office Action, and translation thereof, from counterpart Korean Application No. 10-2023-7043622 dated Jun. 2, 2025, 5 pp.

First Examination Report from counterpart Indian Application No. 202347086720 dated May 2, 2025, 8 pp.

Office Action, and translation thereof, from counterpart Japanese Application No. 2023-572858 dated Jun. 17, 2025, 7 pp.

Office Action, and translation thereof, from counterpart Korean Application No. 10-2023-7043622 dated Feb. 3, 2025, 11 pp.

Response to Communication Pursuant to Rules 161(1) and 162 EPC dated Jan. 12, 2024, from counterpart European Application No. 22734457.9, filed Jul. 9, 2024, 48 pp.

Response to Office Action, and translation thereof, dated Feb. 3, 2025, from counterpart Korean Application No. 10-2023-7043622 filed Mar. 21, 2025, 33 pp.

Search Report, and translation thereof, from counterpart Japanese Application No. 2023-572858 dated May 16, 2025, 41 pp.

Response to First Examination Report, and translation thereof, dated May 2, 2025, from counterpart Indian Application No. 202347086720 filed Aug. 12, 2025, 14 pp.

Response to Office Action, and translation thereof, dated Jun. 2, 2025, from counterpart Korean Application No. 10-2023-7043622 filed Aug. 27, 2025, 35 pp.

Shah et al., "AutoAI-TS: AutoAI for Time Series Forecasting", arXiv:2102.12347v2, Mar. 8, 2021, 13 pp.

Response to Office Action dated Jun. 17, 2025, from counterpart Japanese Application No. 2023-572858 filed Sep. 9, 2025, 16 pp.

Summons to Attend Oral Proceedings from counterpart Indian Application No. 202347086720 dated Oct. 3, 2026, 3 pp.

Notice of Intent to Grant, and translation thereof, from counterpart Korean Application No. 10-2023-7043622 dated Nov. 5, 2025, 4 pp.

Decision of Rejection, and translation thereof, from counterpart Japanese Application No. 2023-572858 dated Dec. 17, 2025, 5 pp.

Notice of Intent to Grant and Text Intended to Grant from counterpart European Application No. 22734457.9 dated Dec. 23, 2025, 35 pp.

Notice of Appeal, and translation thereof, from counterpart Japanese Application No. 2023-572858, filed Apr. 13, 2026, 16 pp.

Notice of Intent to Grant from counterpart Indian Application No. 202347086720 dated Apr. 10, 2026, 1 pp.

Response to Office Action dated Feb. 9, 2026, from counterpart Indian Application No. 202347086720 filed Mar. 25, 2026, 32 pp.

First Office Action and Search Report, and translation thereof, from counterpart Chinese Application No. 202280037524.0 dated Apr. 16, 2026, 18 pp.

* cited by examiner

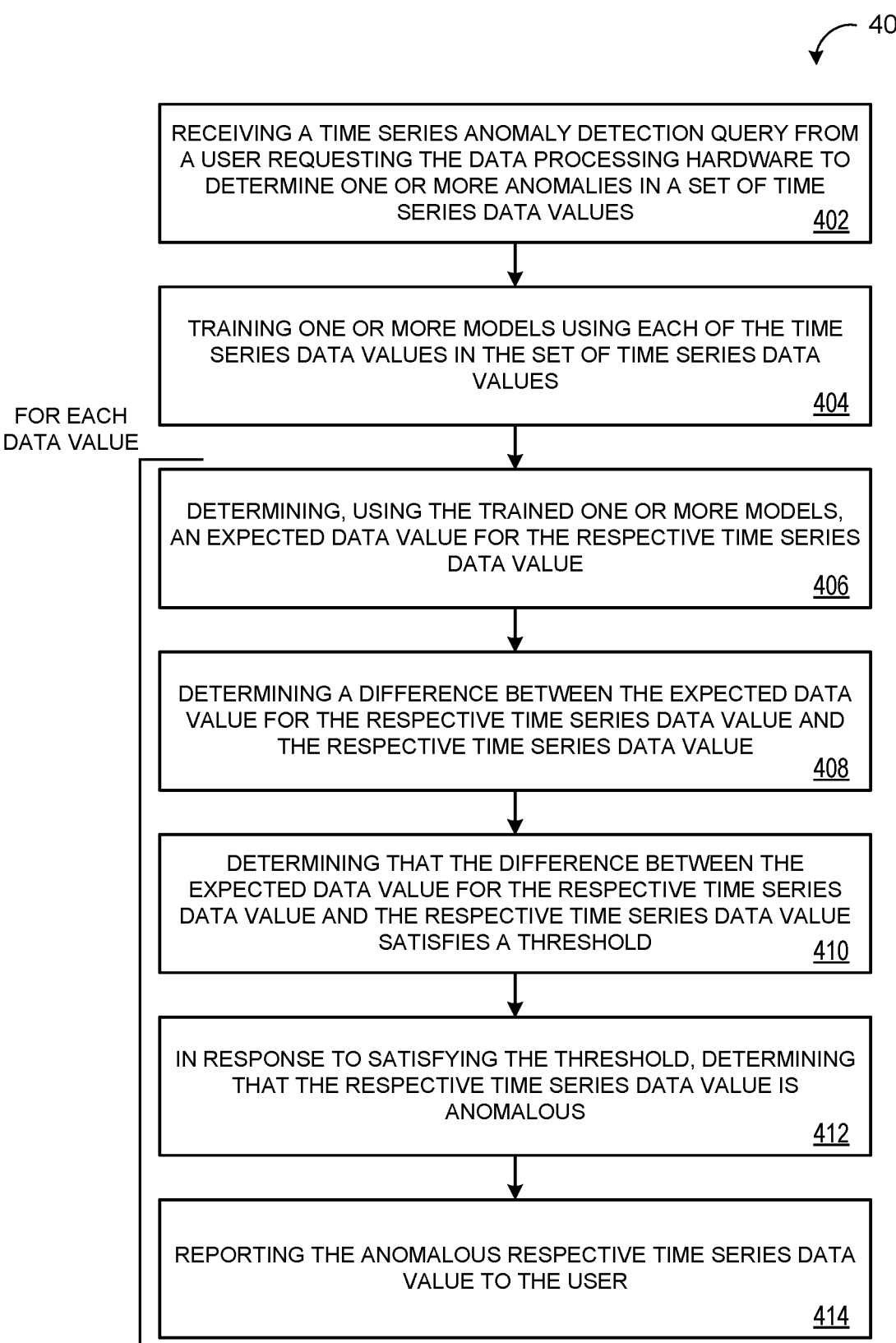

FOR EACH
DATA VALUE

RECEIVING A TIME SERIES ANOMALY DETECTION QUERY FROM A USER REQUESTING THE DATA PROCESSING HARDWARE TO DETERMINE ONE OR MORE ANOMALIES IN A SET OF TIME SERIES DATA VALUES 402

TRAINING ONE OR MORE MODELS USING EACH OF THE TIME SERIES DATA VALUES IN THE SET OF TIME SERIES DATA VALUES 404

DETERMINING, USING THE TRAINED ONE OR MORE MODELS, AN EXPECTED DATA VALUE FOR THE RESPECTIVE TIME SERIES DATA VALUE 406

DETERMINING A DIFFERENCE BETWEEN THE EXPECTED DATA VALUE FOR THE RESPECTIVE TIME SERIES DATA VALUE AND THE RESPECTIVE TIME SERIES DATA VALUE 408

DETERMINING THAT THE DIFFERENCE BETWEEN THE EXPECTED DATA VALUE FOR THE RESPECTIVE TIME SERIES DATA VALUE AND THE RESPECTIVE TIME SERIES DATA VALUE SATISFIES A THRESHOLD 410

IN RESPONSE TO SATISFYING THE THRESHOLD, DETERMINING THAT THE RESPECTIVE TIME SERIES DATA VALUE IS ANOMALOUS 412

REPORTING THE ANOMALOUS RESPECTIVE TIME SERIES DATA VALUE TO THE USER 414

FIG. 4

MACHINE LEARNING TIME SERIES ANOMALY DETECTION

CROSS REFERENCE TO RELATED APPLICATIONS

This U.S. patent application claims priority under 35 U.S.C. § 119(e) to U.S. Provisional Application 63/193,022, filed on May 25, 2021. The disclosure of this prior application is considered part of the disclosure of this application and is hereby incorporated by reference in its entirety.

TECHNICAL FIELD

This disclosure relates to machine learning time series anomaly detection.

BACKGROUND

Anomaly detection in time series data has a wide range of applications such as credit card fraud detection, intrusion detection in cybersecurity, or fault diagnosis in industry. There are two primary types of anomalies in time series. The first type of anomalies are related to noise, erroneous, or unwanted data, which are generally not interesting to data analysts. These types of anomalies should typically be deleted or corrected to improve the data quality and generate a cleaner dataset that can be used by other data mining algorithms. For example, sensor transmission errors are eliminated to obtain more accurate predictions. The second type of anomalies are related to some events of interest. In recent years and, especially in the area of time series data, many researchers have aimed to detect and analyze unusual but interesting phenomena. Fraud detection is a common example as the main objective to detect and analyze the anomaly itself.

SUMMARY

One aspect of the disclosure provides a method for providing machine learning time series anomaly detection. The computer-implemented method, when executed by data processing hardware, causes the data processing hardware to perform operations. The operations include receiving a time series anomaly detection query from a user. The time series anomaly detection query requests the data processing hardware to determine one or more anomalies in a set of time series data values. The operations include training one or more models using each of the time series data values in the set of time series data values. For each respective time series data value in the set of time series data values, the operations include determining, using the trained one or more models, an expected data value for the respective time series data value and determining a difference between the expected data value for the respective time series data value and the respective time series data value. For each respective time series data value in the set of time series data values, the operations also include determining that the difference between the expected data value for the respective time series data value and the respective time series data value satisfies a threshold and, in response to determining that the difference between the expected data value for the respective time series data value and the respective time series data value satisfies the threshold, determining that the respective time series data value is anomalous. The operations include reporting the anomalous respective time series data value to the user.

Implementations of the disclosure may include one or more of the following optional features. In some implementations, determining, using the trained one or more models, the expected data value for the respective time series data value includes decomposing, using the trained one or more models, each time series data value in the set of time series data values into a plurality of components. In some of these implementations, determining, using the trained one or more models, the expected data value for the respective time series data value further includes aggregating two or more components of the plurality of components. In some of these implementations, the one or more models include a separate model for each component of the plurality of components. Optionally, the plurality of components includes one or more of a trend component, a holiday effect component, a seasonal component, and a step change component.

In some examples, the threshold is based on an anomaly probability received from the user. The time series anomaly detection query may include a single Structured Query Language (SQL) query. The single SQL query, in some implementations, requests the data processing hardware to determine one or more anomalous data values in a plurality of sets of time series data values. Optionally, at least one of the one or more models includes an auto regressive integrated moving average model.

The operations may further include forecasting, using the trained one or more models, a future time series data value. After forecasting the future time series data value, the operations may further include receiving an additional time series data value associated with the future time series data value and determining a difference between the future time series data value and the additional time series data value. The operations may also further include determining that the difference between the future time series data value and the additional time series data value satisfies the threshold. In response to determining that the difference between the future time series data value and the additional time series data value satisfies the threshold, the operations further include determining that the additional time series data value is anomalous and reporting the anomalous additional time series data value to the user. In some examples, the set of time series data values comprises a set of univariate time series data values.

Another aspect of the disclosure provides a system for machine learning time series anomaly detection. The system includes data processing hardware and memory hardware in communication with the data processing hardware. The memory hardware stores instructions that when executed on the data processing hardware cause the data processing hardware to perform operations. The operations include receiving a time series anomaly detection query from a user. The time series anomaly detection query requests the data processing hardware to determine one or more anomalies in a set of time series data values. The operations include training one or more models using each of the time series data values in the set of time series data values. For each respective time series data value in the set of time series data values, the operations include determining, using the trained one or more models, an expected data value for the respective time series data value and determining a difference between the expected data value for the respective time series data value and the respective time series data value. For each respective time series data value in the set of time series data values, the operations also include determining that the difference between the expected data value for the respective time series data value and the respective time series data value satisfies a threshold and, in response to determining that the difference between the expected data value for the respective time series data value and the respective time series data value satisfies the threshold, determining that the respective time series data value is anomalous. The operations include reporting the anomalous respective time series data value to the user.

This aspect may include one or more of the following optional features. In some implementations, determining, using the trained one or more models, the expected data value for the respective time series data value includes decomposing, using the trained one or more models, each time series data value in the set of time series data values into a plurality of components. In some of these implementations, determining, using the trained one or more models, the expected data value for the respective time series data value further includes aggregating two or more components of the plurality of components. In some of these implementations, the one or more models include a separate model for each component of the plurality of components. Optionally, the plurality of components includes one or more of a trend component, a holiday effect component, a seasonal component, and a step change component.

In some examples, the threshold is based on an anomaly probability received from the user. The time series anomaly detection query may include a single Structured Query Language (SQL) query. The single SQL query, in some implementations, requests the data processing hardware to determine one or more anomalous data values in a plurality of sets of time series data values. Optionally, at least one of the one or more models includes an auto regressive integrated moving average model.

The operations may further include forecasting, using the trained one or more models, a future time series data value. After forecasting the future time series data value, the operations may further include receiving an additional time series data value associated with the future time series data value and determining a difference between the future time series data value and the additional time series data value. The operations may also further include determining that the difference between the future time series data value and the additional time series data value satisfies the threshold. In response to determining that the difference between the future time series data value and the additional time series data value satisfies the threshold, the operations further include determining that the additional time series data value is anomalous and reporting the anomalous additional time series data value to the user. In some examples, the set of time series data values comprises a set of univariate time series data values.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flowchart of an example arrangement of operations for a method of detecting anomalies in time series data.

4

Figure 5:
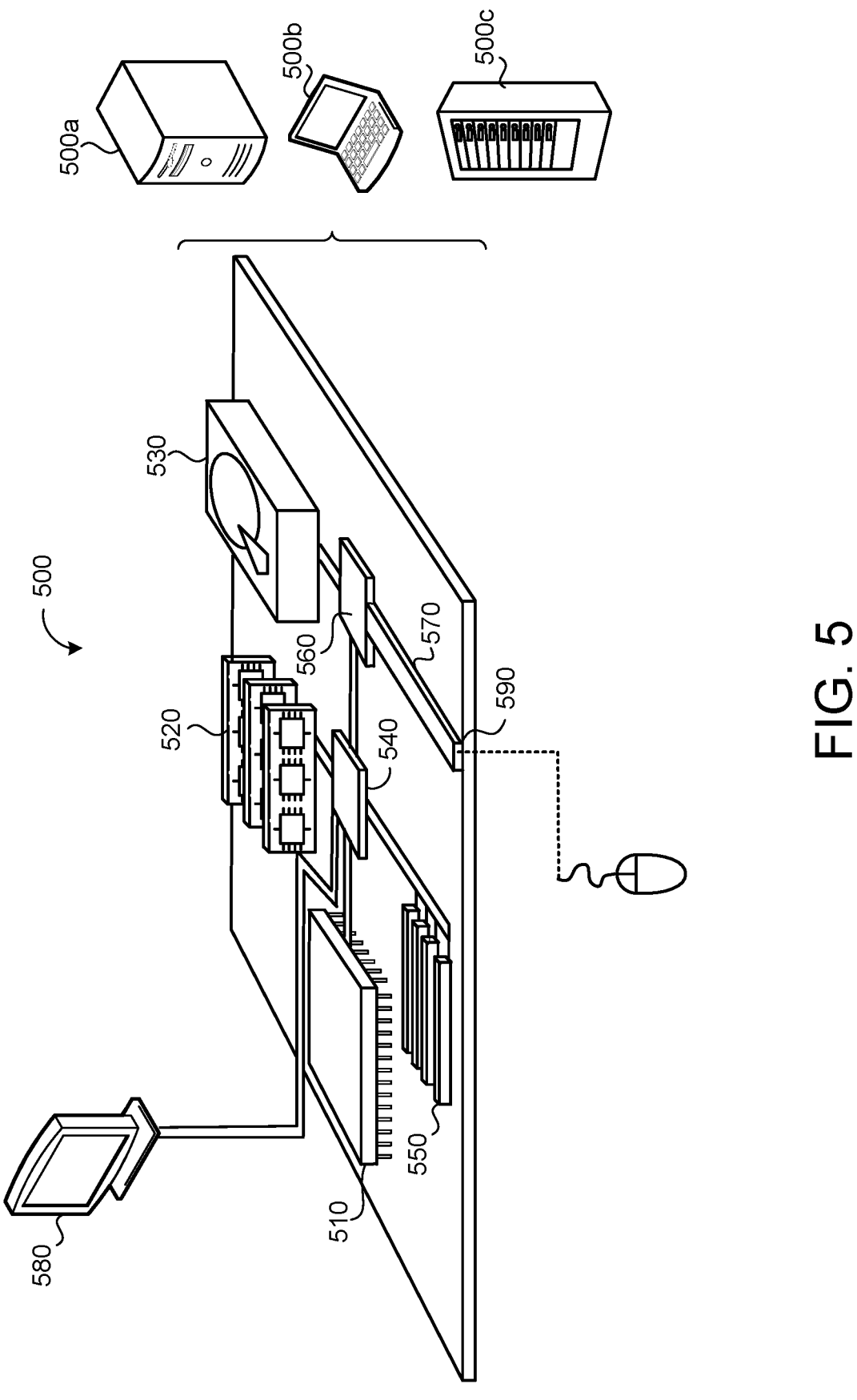

FIG. 5 is a schematic view of an example computing device that may be used to implement the systems and methods described herein.

Like reference symbols in the various drawings indicate like elements.

DETAILED DESCRIPTION

A time series is a series of data points in chronological sequence (typically in regular intervals). Analysis on a time series may be applied to any variable that changes over time (e.g., industrial processes or business metrics). Time series forecasting is the practice of predicting (i.e., extrapolating) future data values based on past data values. Because so many prediction problems involve a time component, time series forecasting is an active area of interest. Specifically, time series forecasting has become a significant domain for machine learning. However, due to the inherent non-stationarity and uncertainty, time series forecasting remains a challenging problem.

Anomaly detection in time series data has a wide range of applications such as credit card fraud detection, intrusion detection in cybersecurity, or fault diagnosis in industry. There are two primary types of anomalies in time series data. For the first type, anomaly detection allows users to discard data points that are the result of, for example, noise, errors, or other unwanted data to improve the quality of the remaining data. For the second type, anomaly detection is important because the anomaly itself is an event of interest.

Implementations herein are directed toward a time series anomaly detection system that is capable of automatically detecting anomalies at large-scale. The system may detect anomalies in historical data or detect anomalies in future data using one or more trained models, which allows users to become immediately aware of unusual data. The system helps users detect anomalies in historical data, which not only processes the time series for further analysis, but also identifies special events that happened during the past. The system also helps users detect anomalies in future data using a trained model to shorten time until discovery of issues. For example, when traffic for a specific product page suddenly and unexpectedly increases, the cause may be from an error in a pricing process that leads to an erroneously low price. The system is also highly scalable, which allows users to use an online query (e.g., a Structured Query Language (SQL) query) to detect anomalies in hundreds of thousands of time series or more.

Figure 1:
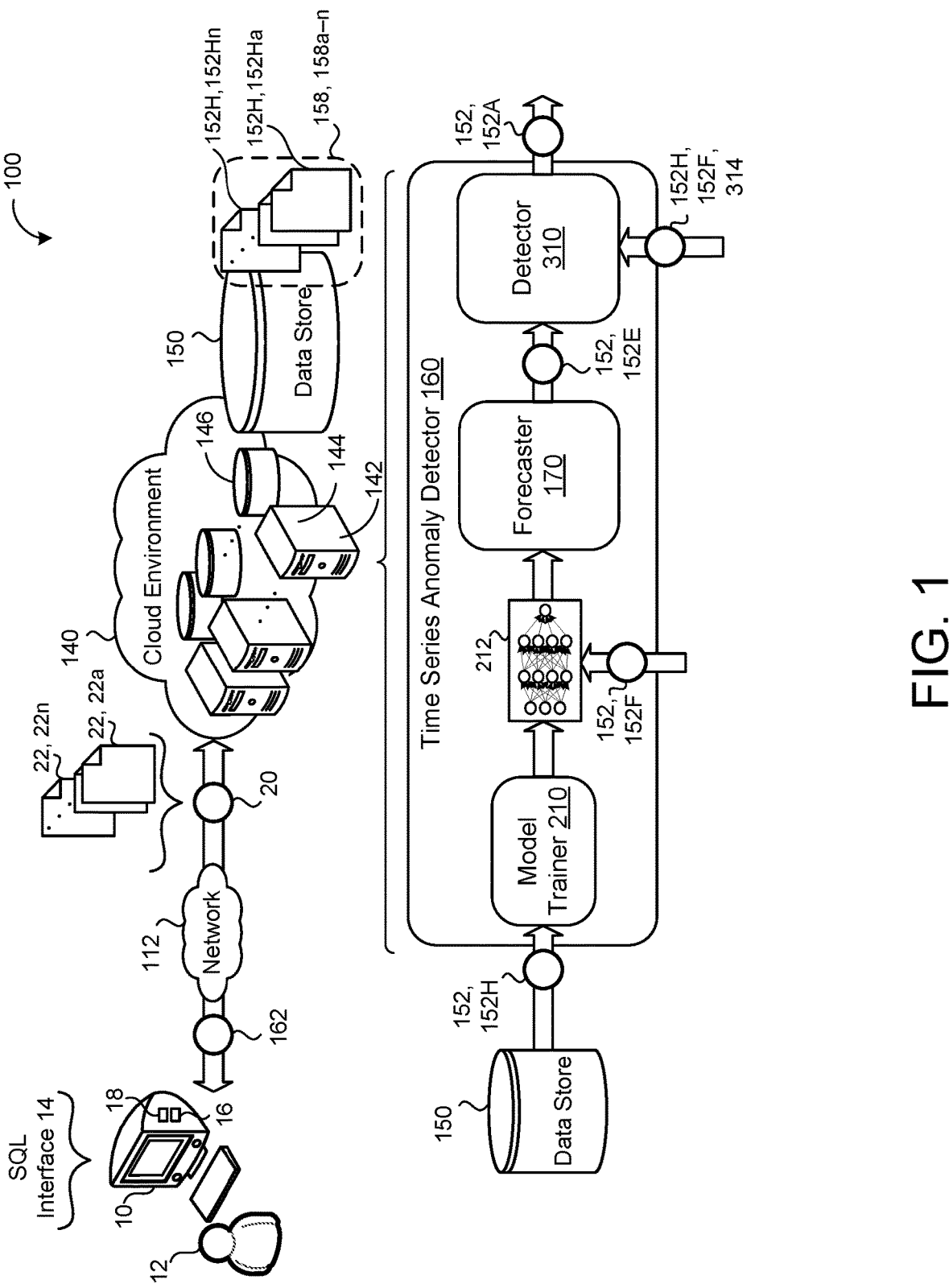
FIG. 1 is a schematic view of an example system for detecting anomalies in time series data.

Referring now to FIG. 1, in some implementations, an example time series anomaly detection system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of time series data values 152, 152a—n within one or more tables 158, 158a—n (i.e., a cloud database). The data store 150 may store any number of tables 158 at any point in time.

The remote system 140 is configured to receive a time series anomaly detection query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the query 20 using a Structured Query Language (SQL) interface 14. Each time series anomaly detection query 20 requests the remote system 140 to determine whether one or more anomalies are present in one or more detection requests 22, 22a—n.

The remote system 140 executes a time series anomaly detector 160 for detecting anomalous data values 152, 152A in historical data values 152, 152H (e.g., univariate time series data values 152) and future time series data values, 152, 152F. The time series anomaly detector 160 is configured to receive the query 20 from the user 12 via the user device 10. Each query 20 may include multiple detection requests 22, 22a—n. Each detection request 22 requests the time series anomaly detector 160 to detect one or more anomalous data values 152A in a different set of time series data values 152. That is, the query 20 may include a request for the time series anomaly detector 160 to determine one or more anomalous data values 152A in multiple different sets of time series data values 152 simultaneously.

A model trainer 210 generates and/or trains one or more forecasting models 212 for each detection request 22 consecutively or simultaneously. The model trainer 210 may train the forecasting model(s) 212 on historical data values 152H retrieved from one or more tables 158 stored on the data store 150 that are associated with the detection requests 22. That is, the query 20 may include multiple detection requests 22 each requesting the remote system 140 to detect anomalous data values 152A in the historical data values 152H located in one or more tables 158 stored on the data store 150. Alternatively, the query 20 includes the historical data value 152H. In this case, the user 12 (via the user device 10) may provide the historical data value 152H when the historical data value 152H is not otherwise available via the data storage 150. In some examples, the historical data values 152H are stored in databases with multiple columns and multiple rows. For example, one column includes the time series data while another column includes timestamp data that correlates specific points in time with the time series data.

The model trainer 210 may generate and/or train multiple forecasting models 212 with different parameters. For example, the model trainer 210 generates and train a plurality of autoregressive integrated moving average (ARIMA) models with different orders of the autoregressive models (i.e., the number of time lags and commonly represented as the parameter p), different degrees of differencing (i.e., the number of times the data has had past values subtracted and commonly represented as the parameter d), and an order of the moving-average model (i.e., a size of the moving average window and commonly represented as the parameter q). Using a combination of different parameters (e.g., parameters p, d, and q), the model trainer 210 generates a corresponding forecasting model 212 for each combination. Each model 212 is trained using the same historical data value 152H. One or more parameters may be configurable or partially-configurable by the user 12.

The model trainer 210 may perform hyper-parameter tuning (also known as hyper-parameter optimization) when generating and training the forecasting model(s) 212. A hyper-parameter is a parameter that controls or adjusts the actual learning process while other parameters (e.g., node weights) are learned. For example, the model trainer 210 performs hyper-parameter tuning on a data frequency and non-seasonal order parameters. The model trainer 210 may generate and train forecasting models 212 capable of modeling many different aspects of time series. For example, the forecast models 212 accounts for seasonal effects, holiday effects, modeling drift, and anomalies.

The time series anomaly detector 160 includes a forecaster 170. The forecaster 170, using the trained one or more models 212, forecasts or determines an expected data value 152, 152E. The forecaster 170 may forecast expected data values 152E for each of the historical data values 152H. That is, after the model 212 is trained, the time series anomaly detector 160 may provide each historical data value 152H to the trained model 212, and based on the model's prediction, the forecaster 170 determines an expected data value 152E for the respective historical data value 152H. The forecaster 170 may also forecast expected data values 152E for future data values 152F. The historical data values 152H represent time series data values 152 that the model 212 trains on while future data values 152F represent time series data values 152 that the model 212 does not train on. For example, the time series anomaly detector 160 receives the future data values 152F after training the model 212 is complete.

The time series anomaly detector 160 includes a detector 310. The detector 310 receives the expected data values 152E output from the forecaster 170 and the corresponding historical data value 152H or future data value 152F that was provided as input to the model 212. The detector 310 may determine a difference between the expected data value 152E and the corresponding historical data value 152H or future data value 152F. When the difference between the expected data value 152E and the corresponding historical data value 152H (i.e., time series data values 152 the time series anomaly detector 160 receives before or during training the models 212) or future data value 152F (i.e., time series data values 152 the time series anomaly detector 160 receives after training the model and forecasting the expected data value 152E) satisfies a threshold (e.g., based on an anomaly probability threshold 314 (FIG. 3) received from the user 12), the detector 310 may determine that the corresponding historical data value 152H or future data value 152F is anomalous. In this situation, the detector 310 may report the anomalous respective time series data value 152A to the user 12.

Figure 2:
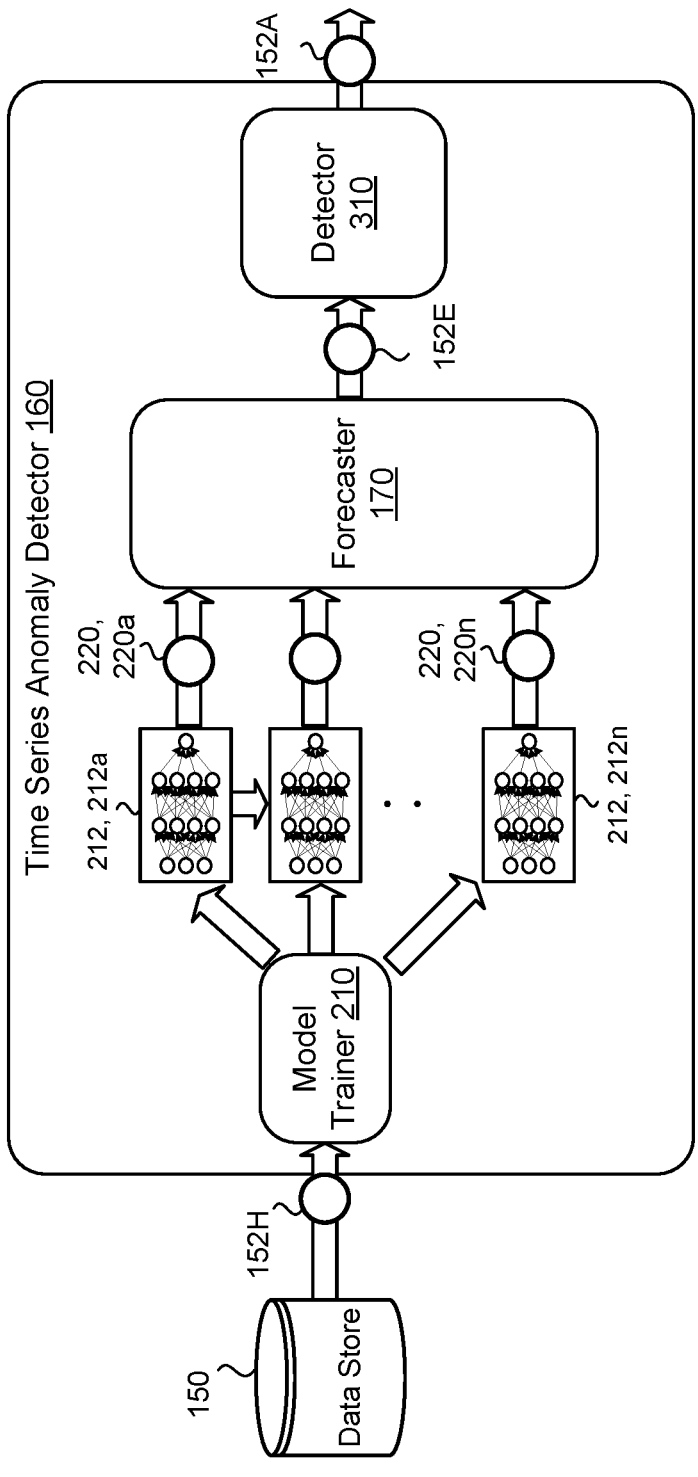
FIG. 2 is a schematic view of exemplary components of the system of FIG. 1.

Referring now to FIG. 2, in some implementations, the time series anomaly detector 160 includes a plurality of models 212a—n. In these implementations, the model trainer 210 trains each of the plurality of models 212 using the historical data values 152H. In some examples, one or more of the trained models 212 decompose the input time series data value 152 (i.e., the historical data values 152H and/or the future data values 152F) into a plurality of components 220, 220a—n. The forecaster 170 may receive the plurality of components 220 and aggregate two or more of the components 220 to forecast the expected data value 152E.

In some examples, each of the plurality of models 212 decomposes a different component 220 from the input time series data value 152. For example, one model 212 is trained to perform a holiday adjustment and generate or predict a holiday component 220 of the time series data value 152. As another example, a different model 212 is trained to perform a seasonal and trend decomposition (e.g., using local regression) and generator or predict a seasonal component 220 of the time series data value 152. The seasonal component 220 may account for variations in the time series data values 152 that repeat over a specific period (e.g., a day, week, month, etc.). For example, an increase in sales in December represents a seasonal effect of the seasonal component 220. The time series anomaly detector 160 may decompose (e.g., via one or more models 212) the time series data values 152 into a number of other components 220, such as a trend component 220, an outlier component 220, a spike and dip component 220, and a step change component 220. The trend component 220 may represent trends in the data that move up or down in a reasonably predictable pattern.

In some examples, one or more models 212 are used to train other models 212 of the time series anomaly detector 160. For example, the model trainer 210 first trains a holiday adjustment model 212 using the historical data values 152H. After the holiday adjustment model 212 is trained, the model trainer 210 may train an outlier model 212 using time series data values 152 with the holiday component 220 removed by the holiday adjustment model 212. Similarly, the model trainer 210 may train a seasonal and trend decomposition model 212 using time series data values 152 with the holiday component 220 removed by the holiday adjustment model 212 and outliers removed by the outlier model 212. In this way, the model trainer 210 may train a "chain" of models 212 that each are responsible for generating one of the decomposition components 220 of the time series data values 152.

In some implementations, the forecaster 170 forecasts the expected data values 152E based on a sum of multiple components 220 predicted or determined by the model(s) 212. For example, the forecaster 170 forecasts the expected data value 152E based on a sum of a trend component 220, a holiday effect component 220, a seasonal period component 220, and a step change component 220. In scenarios where the step change component 220 cannot be predicted (e.g., for future data values 152F), the forecaster 170 may forecast the expected data value 152E based on a sum of the trend component 220, the holiday effect component 220, and the seasonal period component 220. The forecaster 170 provides the expected data value 152E to the detector 310.

Figure 3:
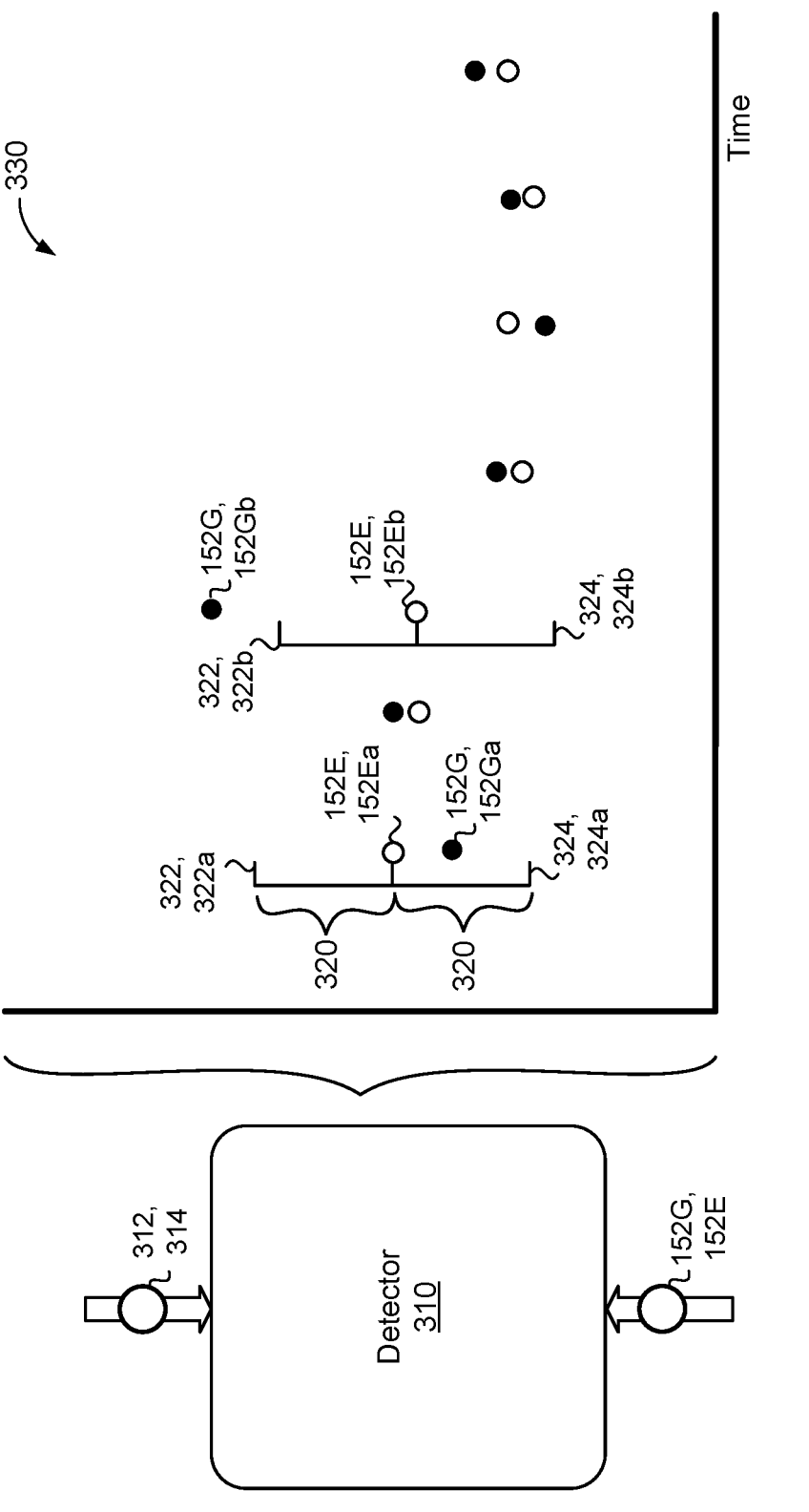
FIG. 3 is a schematic view of an exemplary detector of the system of FIG. 1.

Referring now to FIG. 3, in some examples, the detector 310 determines a difference between each expected data value 152E and a ground truth data value 152G (e.g., a historical data value 152H that has been verified via a measurement) used to forecast or predict the expected data value 152E. Based on this difference, the detector 310 determines whether the ground truth data value 152G is anomalous. In some implementations, the detector 310 determines an interval size 320 that defines an upper bound 322 and a lower bound 324. Based on the upper bound 322 and the lower bound 324, the detector 310 determines whether a ground truth data value 152G satisfies a threshold and is anomalous. In some examples, the upper bound 322 is equal to the expected data value 152E plus the interval size 320 and the lower bound 324 is equal to the expected data value 152E minus the interval size 320. For example, when the ground truth data value 152G exceeds the expected data value 152E by more than a value established by the upper bound 322 or by less than a value established by the lower bound 324, the detector 310 determines the ground truth data value 152G is anomalous. Conversely, when the ground truth data value 152G is less than the upper bound 322 and greater than the lower bound 324 (i.e., close enough to the expected data value 152E), the detector 310 determines that the ground truth data value 152G is not anomalous.

In some implementations, the detector 310 determines the interval size 320, the upper bound 322, and the lower bound 324 based on a standard error 312 from the trained model(s) and/or an anomaly probability threshold 314. The standard error 312 represents an amount of error measured during training of the models 212. For example, a model 212 with a large error (i.e., the expected data values 152E predicted during training had significant error) is less trustworthy, and thus results in a larger interval size 320. On the other hand, a highly accurate model 212 (i.e., with a low standard error 312) may result in a relatively smaller interval size 320. The anomaly probability threshold 314 may be a user-configurable value (e.g., received via the query 20) that affects the interval size 320. The anomaly probability threshold 314 provides the user 12 with the ability to customize or configure the interval size 320 and thus a likelihood that a ground truth data value is 152G is anomalous. That is, the anomaly probability threshold 314 allows the user 12 to configure a rate of false positives. When the user 12 is sensitive to false positives, the user 12 may opt for a small anomaly probability threshold 314. Conversely if detection is more important than false positives, the user 12 may opt for a larger anomaly probability threshold 314. In some examples, the anomaly probability threshold 314 establishes a confidence threshold the detector 310 must achieve before reporting a time series data value 152 as anomalous. For example, the user 12 provides a 95% anomaly probability threshold 314, which results in the detector 310 only reporting time series data values 152 as anomalous that the detector 310 determines have a 95% or greater probability of being anomalous. In these implementations, the detector 310 decreases the interval size 320 the larger the anomaly probability threshold 314.

In the illustrated example, a plot 330 includes a first expected data value 152E, 152Ea and a first ground truth data value 152G, 152Ga. In this example, a first upper bound 322, 322a spans values of the y-axis of the plot 330 from the first expected data value 152Ea plus one interval size 320. Likewise, a first lower bound 324, 324a spans the values of the y-axis of the plot 330 from the first expected data value 152Ea minus one interval size 320. Here, the first ground truth data value 152Ga is greater than the first lower bound 324a and less than the second upper bound 322a, and thus the detector 310 determines that the first ground truth data value 152Ga is not anomalous. A second expected data value 152E, 152Eb of the plot 330 establishes a second upper bound 322, 322b and a second lower bound 324, 324b. This time, a second ground truth data value 152G, 152Gb is greater than the second upper bound 322b, and thus the detector 310 determines that the second ground truth data value 152G is anomalous. While not shown, the detector 310 may determine the upper bound 322 and the lower bound 324 (based on the interval size 320) for each expected data value 152E the models 212 predict. Using the upper bound 322 and the lower bound 324 for each expected data value 152E, the detector 310 determines whether a corresponding ground truth data value 152G (i.e., the actual time series data value 152 being compared to the expected data value 152E) is anomalous. The detector 310 may report only anomalous data values 152A to the user 12. Additionally or alternatively, the detector 310 reports data regarding the comparison (e.g., the relative difference between the expected data value 152E and the ground truth data value 152G) for each time series data value 152.

FIG. 4 is a flowchart of an exemplary arrangement of operations for a method 400 of detecting anomalies in time series data. The method 400, at operation 402, includes receiving a time series anomaly detection query 20 from a user 12. The time series anomaly detection query 20 requests data processing hardware 142 to determine one or more anomalies in a set of time series data values 152. At operation 404, the method 400 includes training one or more models 212 using each of the time series data values 152 in the set of time series data values 152. At operation 406, the method 400 includes, for each respective time series data value 152 in the set of time series data values 152, determining, using the trained one or more models 212, an expected data value 152E for the respective time series data value 152. The method 400, at operation 408, includes determining a difference between the expected data value 152E for the respective time series data value 152 and the respective time series data value 152. At operation 410, the method 400 includes determining that the difference between the expected data value 152E for the respective time series data value 152 and the respective time series data value 152 satisfies a threshold. At operation 412, the method 400, in response to determining that the difference between the expected data value 152E for the respective time series data value 152 and the respective time series data value 152 satisfies the threshold, includes determining that the respective time series data value 152 is anomalous. At operation 414, the method 400 includes reporting the anomalous respective time series data value 152A to the user 12.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:

receiving, by data processing hardware, a time series anomaly detection query from a user, the time series anomaly detection query requesting the data processing hardware to determine one or more anomalies in a set of time series data values;

training, by the data processing hardware, a chain of two or more models using each time series data value in the set of time series data values, wherein the two or more models includes a separate model for each component from a plurality of components to improve scalability by at least:

training, by the data processing hardware, a first model of the chain to determine a holiday effect component for the set of time series data values;

removing, by the data processing hardware, the holiday effect component from the time series data values to generate first intermediate data;

training, by the data processing hardware, an outlier model of the chain using the first intermediate data to determine an outlier component removing, by the data processing hardware, the outlier component from the first intermediate data to generate second intermediate data; and training, by the data processing hardware, a second model of the chain using the second intermediate data to determine a seasonal component and a trend component; and for each respective time series data value in the set of time series data values:

determining, by the data processing hardware and using the chain of two or more models, an expected data value for the respective time series data value by at least:

decomposing, using the chain of two or more models, the respective time series data value into the plurality of components, wherein each model from the chain of two or more models generates one component of the plurality of components; and aggregating two or more components of the plurality of components into the expected data value by summing at least the trend component, the holiday effect component, and the seasonal component;

determining, by the data processing hardware, a difference between the expected data value for the respective time series data value and the respective time series data value;

determining, by the data processing hardware, whether the difference between the expected data value for the respective time series data value and the respective time series data value satisfies a threshold;

in response to determining that the difference between the expected data value for the respective time series data value and the respective time series data value satisfies the threshold, determining, by the data processing hardware, that the respective time series data value is anomalous; and reporting, by the data processing hardware, the respective time series data value to the user.

2. The method of claim 1, wherein the plurality of components comprises one or more of a trend component, a holiday effect component, a seasonal component, and a step change component.

3. The method of claim 1, wherein the threshold is based on an anomaly probability received from the user.

4. The method of claim 1, wherein the time series anomaly detection query comprises a single Structured Query Language (SQL) query.

5. The method of claim 4, wherein the single SQL query requests the data processing hardware to determine one or more anomalous data values in a plurality of sets of time series data values.

6. The method of claim 1, wherein the chain of two or more models comprises a plurality of auto regressive integrated moving average models with different orders of autoregressive models, different degrees of differencing, and an order of a moving-average model.

7. The method of claim 1, further comprising:
forecasting, using the chain of two or more models, a future time series data value;
after forecasting the future time series data value, receiving an additional time series data value associated with the future time series data value;
determining a difference between the future time series data value and the additional time series data value;
determining whether the difference between the future time series data value and the additional time series data value satisfies the threshold;
in response to determining that the difference between the future time series data value and the additional time series data value satisfies the threshold, determining that the additional time series data value is anomalous; and
reporting the additional time series data value to the user.

8. The method of claim 1, wherein the set of time series data values comprises a set of univariate time series data values.

9. A system comprising:
data processing hardware; and
memory hardware in communication with the data processing hardware, the memory hardware storing instructions that when executed on the data processing hardware cause the data processing hardware to:
receive a time series anomaly detection query from a user, the time series anomaly detection query requesting the data processing hardware to determine one or more anomalies in a set of time series data values;
train a chain of two or more models using each time series data value in the set of time series data values, wherein the two or more models includes a separate model for each component from a plurality of components to improve scalability by at least:
training a first model of the chain to determine a holiday effect component for the set of time series data values;
removing the holiday effect component from the time series data values to generate first intermediate data;
training an outlier model of the chain using the first intermediate data to determine an outlier component
removing the outlier component from the first intermediate data to generate second intermediate data; and
training a second model of the chain using the inter-mediate second intermediate data to determine a seasonal component and a trend component; and
for each respective time series data value in the set of time series data values:

14 determine, using the chain of two or more models, an expected data value for the respective time series data value by at least:
decomposing, using the chain of two or more models, the respective time series data value into the plurality of components, wherein each model from the chain of two or more models generates one component of the plurality of components; and
aggregating two or more components of the plurality of components into the expected data value by summing at least the trend component, the holiday effect component, and the seasonal component;
determine a difference between the expected data value for the respective time series data value and the respective time series data value;
determine whether the difference between the expected data value for the respective time series data value and the respective time series data value satisfies a threshold;
in response to determining that the difference between the expected data value for the respective time series data value and the respective time series data value satisfies the threshold, determine that the respective time series data value is anomalous; and
report the respective time series data value to the user.

10. The system of claim 9, wherein the plurality of components comprises one or more of a trend component, a holiday effect component, a seasonal component, and a step change component.

11. The system of claim 9, wherein the threshold is based on an anomaly probability received from the user.

12. The system of claim 9, wherein the time series anomaly detection query comprises a single Structured Query Language (SQL) query.

13. The system of claim 12, wherein the single SQL query requests the data processing hardware to determine one or more anomalous data values in a plurality of sets of time series data values.

14. The system of claim 9, wherein the chain of two or more models comprises a plurality of auto regressive integrated moving average models with different orders of autoregressive models, different degrees of differencing, and an order of a moving-average model.

15. The system of claim 9, wherein the instructions further cause the data processing hardware to:
forecast, using the chain of two or more models, a future time series data value;
after forecasting the future time series data value, receive an additional time series data value associated with the future time series data value;
determine a difference between the future time series data value and the additional time series data value;
determine whether the difference between the future time series data value and the additional time series data value satisfies the threshold;
in response to determining that the difference between the future time series data value and the additional time series data value satisfies the threshold, determine that the additional time series data value is anomalous; and
report the additional time series data value to the user.

16. The system of claim 9, wherein the set of time series data values comprises a set of univariate time series data values.

* * * * *